INVENTOR
Charles A. L. Ruhl
BY Dodge and Sons
ATTORNEYS

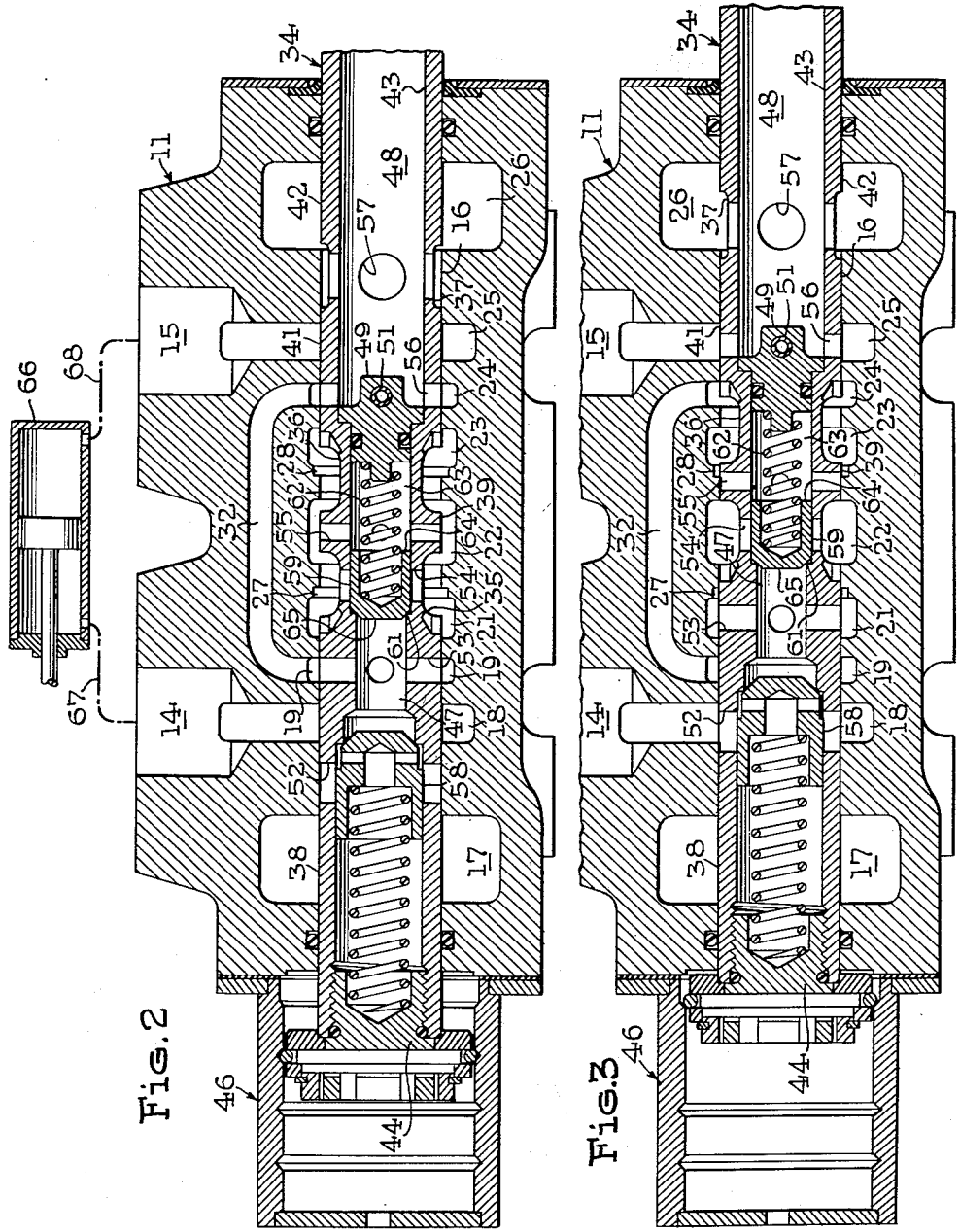

United States Patent Office 3,006,372
Patented Oct. 31, 1961

3,006,372
CONTROL VALVE WITH CAVITATION-MINIMIZING REPLENISHING CIRCUIT
Charles A. L. Ruhl, Kalamazoo, Mich., assignor to The New York Air Brake Company, a corporation of New Jersey
Filed Apr. 22, 1959, Ser. No. 808,043
7 Claims. (Cl. 137—622)

This invention relates to control valves for double-acting fluid pressure motors.

A typical device of this type is an open-center valve which, together with a reservoir, a pump and a double-acting differential area piston motor, forms a control system for positioning the earth-moving blade of a bull-dozer. Usually these valves have four operative positions, viz: a "raise" position in which the pump and reservoir are connected with opposite sides of the piston motor; a "lower" position in which the pump and reservoir connections with the piston motor are reversed; a "neutral" or "hold" position in which the connection with each side of the piston motor is blocked and the pump is unloaded to the reservoir; and a "float" position in which both sides of the piston motor are placed in communication with the pump and an unloading path is established between the pump and the reservoir.

In the past, the "float" position has been made to serve in two separate and conflicting capacities; in the first, it permits the blade to drop from a raised position and in the second, it allows free movement of the blade in operations such as back-dragging. In some cases, during the blade dropping operation, the weight of the blade causes the motor piston to move at such a rate that the fluid entering the expanding chamber of the motor cannot keep pace and voids are created in this chamber. When the valve is subsequently shifted to the "lower" position, the piston motor lags the operator's command until the voids are filled. This condition can be improved by providing a flow restriction in the path from the pump to the reservoir. The restriction creates a back pressure which forces a portion of the pump output into the expanding chamber of the piston motor. This solution would be satisfactory if the "float" position of the valve served only in the blade dropping capacity, because this operation takes only a few seconds and the heating caused by the restriction would be negligible. However, when it is remembered that the float position must also serve in the back-dragging capacity, an operation which can be carried on for relatively long periods of time, it is seen that use of the restriction results in energy losses. Therefore, the amount of restriction is limited because severe restriction would result in large energy losses accompanied by intolerable heating of the hydraulic oil. In addition to decreasing operating efficiency, this heating can also cause serious maintenance problems.

The object of this invention is to provide an improved control valve for systems of the type mentioned above having a "lower" position which can be used to effect dropping of the earth-moving blade without risk of causing the expanding side of the piston motor to cavitate. According to the invention, the "lower" position of the control valve affords a pair of return flow paths from the contracting side of the piston motor; one of the return paths being an exhaust path which leads through a flow restriction to the reservoir, and the other being a replenishing path which leads to the expanding side of the piston motor. Flow through the replenishing path is controlled by a valve which is urged in the passage-closing direction by a spring and by the fluid pressure in the expanding side of the piston motor, and in the passage-opening direction by the back pressure produced in the exhaust path by the flow restriction. When the blade is dropping, the pressure in the expanding side of the piston motor is low and the replenishing valve shifts to the open position, thus permitting at least a portion of the fluid expelled from the contracting side of the piston motor to be conveyed to the expanding side. This replenishing flow keeps the expanding side of the piston motor liquid-filled. When the earth-moving blade strikes the ground, the pressure in the expanding side of the piston motor rises, thus closing the replenishing valve. This action isolates the two sides of the piston motor from each other thereby greatly increasing the pressure differential between them. This differential develops the large force required for digging.

In the preferred embodiment of the invention, the flow restriction is a spring-biased check valve and this valve and the replenishing valve are located within the movable element of the control valve. The check valve is so located that it is in the exhaust path connecting the contracting side of the piston motor with the reservoir when the valve is in "lower" position, and in the supply path connecting the expanding side of the piston motor with the pump when the valve is in "raise" position. In this way, the check valve serves the dual function of causing the replenishing valve to shift when the control valve is in "lower" position, and of holding the piston motor against the weight of the earth-moving blade during the time interval required for the pump to build-up operating pressure when the control valve is shifted to "raise" position.

The preferred embodiment of the invention will now be described in detail with reference to the accompanying drawings, in which:

FIG. 2 is a sectional view taken on line 2—2 of FIG. 1 and showing the connections with the piston motor.

FIG. 3 is a view similar to FIG. 2 showing the valve plunger in "raise" position.

Figure 1:
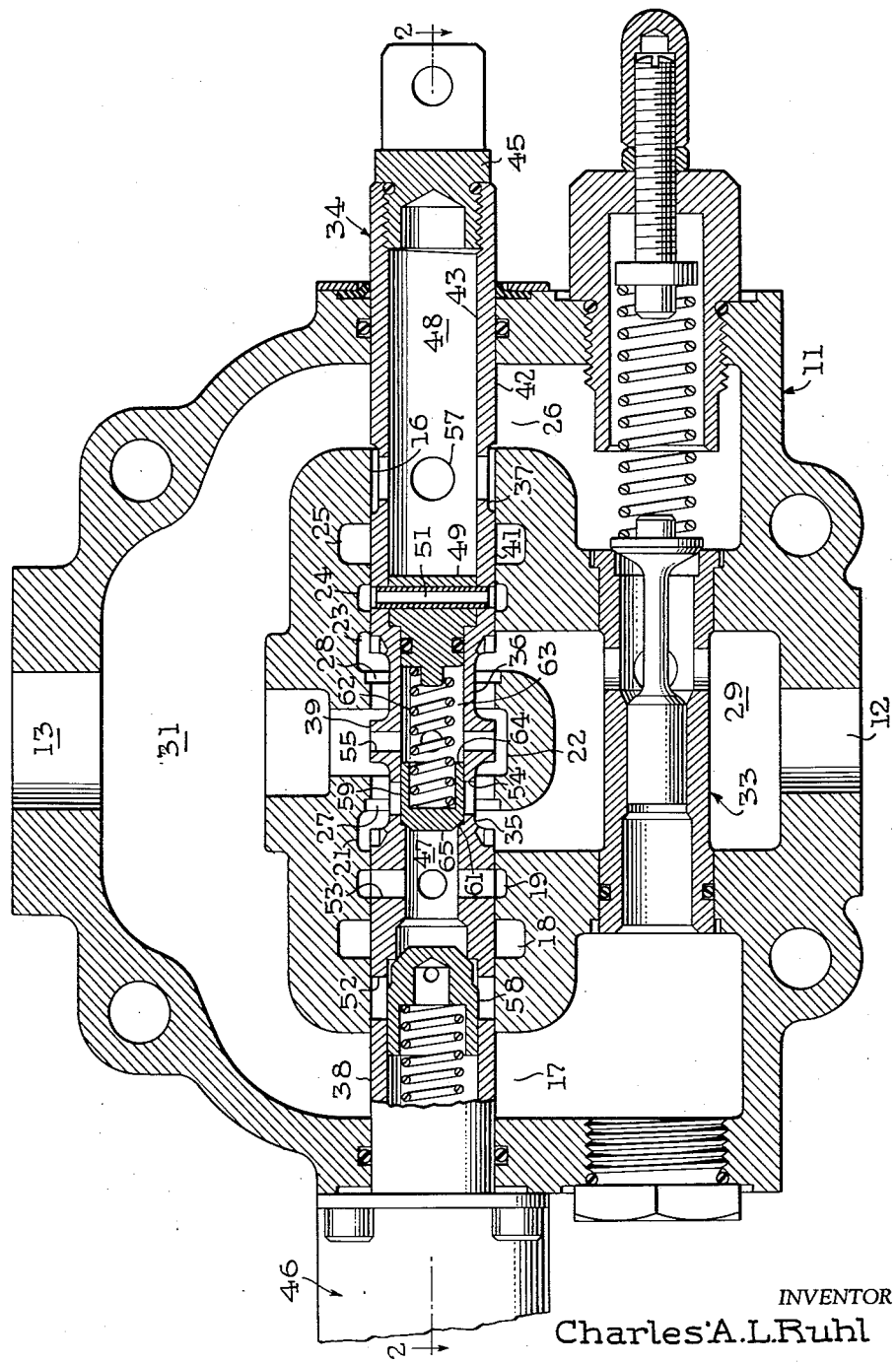
FIG. 1 is a sectional view of a four-position open-center control valve incorporating the invention; the valve plunger being shown in "neutral" position.

Referring to FIGS. 1 and 2, the valve comprises a housing 11 having inlet and exhaust ports 12 and 13, respectively, and two motor ports 14 and 15. Extending through the housing is a bore 16 encircled by nine longitudinally spaced annular chambers 17 through 19 and 21 through 26 and counterbored, as shown, at 27 and 28. Chambers 21 and 23 communicate with inlet port 12 via passage 29 while chambers 17, 22 and 26 communicate with exhaust port 13 via exhaust manifold 31. A cored passageway 32 interconnects annular chambers 19 and 24. Conventional relief valve 33 limits the pressure in passage 29 by by-passing fluid to the exhaust manifold 31.

Mounted in bore 16 is a slidable valve plunger 34 formed with three longitudinally spaced grooves 35, 36 and 37 which define valve lands 38, 39, 41 and 42. The plunger 34 contains an axial bore 43 whose opposite ends are closed and sealed by plugs 44 and 45; the plug 44 forming part of the four-position detent mechanism 46 associated with the valve plunger at its left end. Axial bore 43 is divided into two separate portions 47 and 48 by a plug 49 which is received in the bore and held in place by a pin 51. Four circumferential series of radial passages 52 to 55 extend through the surface of the plunger and intersect bore portion 47, and two similar series 56 and 57 intersect the bore portion 48. A spring-biased check valve 58 is mounted in bore portion 47 between passages 52 and 53 for preventing flow from passages 52 into bore portion 47 when the plunger 34 is in its "raise" position, and for restricting flow from passages 53 to passages 52 when the plunger is in its "lower" position. Flow through bore portion 47 between passages 53 and passages 54 is controlled by a replenishing valve 59. This valve is urged into contact with its seat 61 by spring 62 and by the fluid pressure in chamber 63 which acts on the face 64. The replenishing valve 59 is urged away from its seat by the pressure in bore portion 47 which acts on the face 65.

*Operation*

In use, the inlet and exhaust ports 12 and 13 are connected with a pump and reservoir (not shown), respectively, and motor ports 14 and 15 are connected with the opposite sides of a double-acting differential area piston motor 66 by lines 67 and 68, respectively, as shown in FIG. 2. In the usual case, the motor 66 is installed in such manner that its rod end contracts when the earth-moving blade is dropped.

When the valve plunger 34 is in the "neutral" position (FIGS. 1 and 2), fluid entering inlet port 12 passes freely to the reservoir via passage 29, annular chambers 21 and 23, plunger grooves 35 and 36, annular chamber 22, exhaust manifold 31, and exhaust port 13. The motor ports 14 and 15 are isolated from each other and from inlet and exhaust ports 12 and 13 by plunger lands 38 and 41. Therefore, in this position of the control valve, the pump is unloaded and the controlled motor 66 is hydraulically locked.

In order to raise the earth-moving blade, the operator shifts valve plunger 34 to the right to the "raise" position shown in FIG. 3. This causes plunger lands 38 and 39 to interrupt communication between inlet and exhaust ports 12 and 13, and establishes communication between the rod end of motor 66 and inlet port 12 through a supply path comprising passages 29, annular chamber 21, radial passages 53, bore portion 47, check valve 58, radial passages 52, annular chamber 18, motor port 14, and line 67. Simultaneously, the valve plunger 34 establishes a return path from the piston end of motor 66 to the reservoir via line 68, motor port 15, radial passages 56, bore portion 48, radial passages 57, annular chamber 26, exhaust manifold 31, and exhaust port 13. In this position of valve plunger 34, chamber 63 to the right of replenishing valve 59 is connected with inlet port 12 by radial passages 55, counterbore 28, annular chamber 23, and passage 29. As a result, the pressures acting on the opposed faces 64 and 65 of the replenishing valve are equal and this valve will remain closed. When the motor 66 has moved the desired distance, the operator shifts valve plunger 34 back to the "neutral" position thereby cutting off flow to and from the motor and unloading the pump.

It should be noted that a positive pressure will exist in annular chamber 18 when the earth-moving blade is in an elevated position. Check valve 58 prevents release of this pressure when valve plunger 34 is shifted to its "raise" position and thus serves to maintain the blade in its current position during the time interval required for the pump to build-up operating pressure in bore portion 47.

Figure 4:
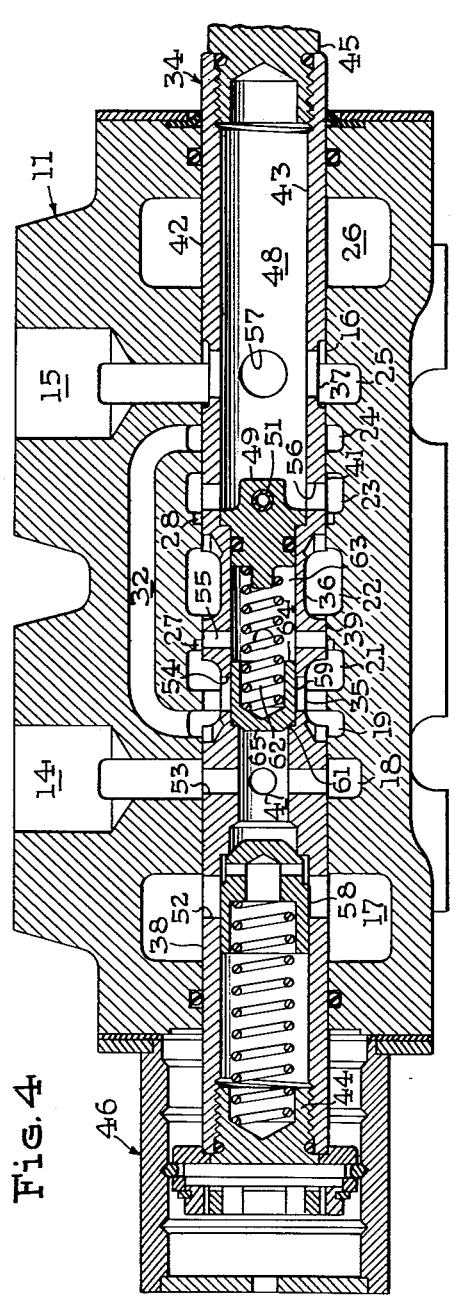
FIG. 4 is a view similar to FIG. 2 showing the valve plunger in "lower" position.

Dropping of the earth-moving blade is accomplished by shifting the valve plunger 34 to the "lower" position shown in FIG. 4. In this position, plunger lands 39 and 41 interrupt communication between inlet and exhaust ports 12 and 13, and passage 29, annular chamber 23, radial passages 56, bore portion 48, radial passages 57, annular chamber 25, motor port 15, and line 68 provide a supply path from the pump to the piston side of controlled motor 66. Fluid expelled from the rod end of motor 66 is transmitted to bore portion 47 by line 67, motor port 14, annular chamber 18, and radial passages 53, where it acts upon and tends to open both check valve 58 and replenishing valve 59. The chamber 63, at the right end of the replenishing valve, is in communication with passage 29 via radial passages 55, counterbore 27, and annular chamber 21, and at the time the blade dropping operation is begun, the pressure in this chamber is relatively low. This is attributable to the fact that the weight of the blade tends to move the piston of motor 66 at such a speed that the rate of change of volume of the expanding side of motor 66 is greater than the rate of delivery of the pump. The spring in check valve 58 is so selected that the pressure in bore portion 47 required to open this valve is greater than that required to open replenishing valve 59 against the bias of spring 62 and the force acting on face 64 as a result of the back pressure created by line 68. Therefore, the return flow from the rod side of motor 66 will open the replenishing valve 59 and pass to the expanding side of motor 66 along a path comprising passages 54, counterbore 27, annular chamber 21, passage 29, annular chamber 23, passages 56, bore portion 48, passages 57, annular chamber 25, motor port 15, and line 68. This replenishing flow, when added to the delivery of the pump, will maintain the piston side of motor 66 liquid-filled during the blade dropping operation.

When the earth-moving blade reaches the ground, the operator can either interrupt operation of motor 66 by returning plunger 34 to its "neutral" position, or commence the digging operation by leaving the plunger in the "lower" position. If the plunger is left in the "lower" position when the blade contacts the ground, the resulting increase in pressure in the piston side of motor 66 will be effective in chamber 63 to close the replenishing valve 59. As this valve closes, the pressure in bore portion 47 increases and causes check valve 58 to open. The rod end of motor 66 will now be connected to the reservoir and the pressure differential across the motor piston will produce the required digging force. When the blade reaches the desired depth, the operator returns the plunger 34 to "neutral" to cut off flow to and from the motor 66 and unload the pump.

Figure 5:
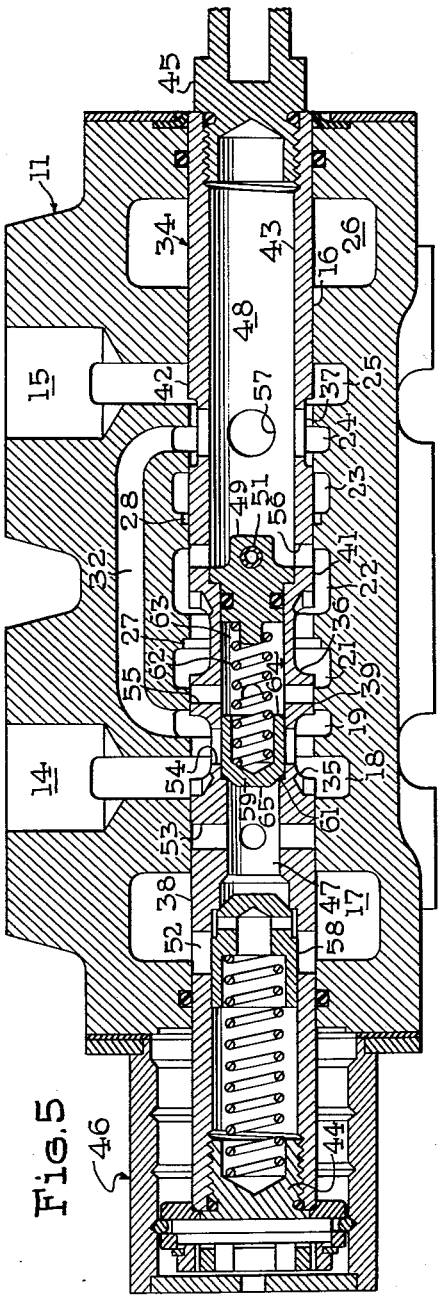
FIG. 5 is a view similar to FIG. 2 showing the valve plunger in "float" position.

Back-dragging can be carried out with the plunger 34 in the "float" position of FIG. 5. In this position, the two motor ports 14 and 15 are interconnected by annular chamber 18, plunger groove 35, annular chamber 19, passageway 32, annular chamber 24, plunger groove 37, and annular chamber 25, and this interconnection communicates with the inlet port 12 through passages 57, bore portion 48, passages 56, annular chamber 23, and passage 29. Inlet port 12 is in free communication with exhaust port 13 via passage 29, annular chamber 21, plunger groove 36, annular chamber 22, and exhaust manifold 31. The "float" position allows the motor 66 to reciprocate freely under the action of external forces for long periods of time while the pump is completely unloaded.

As stated previously, the drawings and description relate only to a preferred embodiment of the invention. Since many changes can be made in the structure of this embodiment without departing from the inventive concept, the following claims should provide the sole measure of the scope of the invention.

What is claimed is:

1. In a control valve of the type including a housing containing inlet and exhaust ports and first and second motor ports, and a movable valve element carrying valving heads which cooperate with seats in the housing to control communication between said ports, and in which the valve element has a first position in which it isolates each motor port from the other three ports, a second position in which it isolates the inlet port from the exhaust port, establishes a flow path between the inlet port and the first motor port, and establishes a flow path between the exhaust port and the second motor port, and a third position in which it isolates the inlet port from the exhaust port, establishes a flow path between the inlet port and the second motor port, and establishes a flow path between the first motor port and the exhaust port, the improvement which comprises a flow restriction located in the flow path connecting the exhaust port and the first motor port; a replenishing circuit including a replenishing passage connecting the flow path between the second motor port and the inlet port with a point in the flow path between the first motor port and the exhaust port upstream of the flow restriction, and a replenishing valve located in the replenishing passage and shiftable in passage-opening and passage-closing directions; resilient means biasing the replenishing valve in the passage-closing direction; first means responsive to the pressure in the flow path connecting the second motor port and the inlet port for urging the replenishing valve in the passage-closing direction; second means responsive to the pressure in the flow path connecting the first motor port and the exhaust port upstream of the flow restriction for urging the replenishing valve in the passage-opening direction; and means carried by the movable valve element and by the housing and associated with the replenishing circuit for preventing flow through the replenishing passage when the movable valve element is in its second position.

2. The improvement defined in claim 1 in which the flow path connecting the exhaust path and the first motor port and the flow path connecting the inlet port and the first motor port have a common portion; the flow restriction is a spring-biased check valve; and in which the check valve is located in said common portion, the parts being so arranged that the check valve prevents flow from the first motor port to the inlet port in the second position and prevents flow from the exhaust port to the first motor port in the third position.

3. The improvement defined in claim 1 in which the means for preventing flow through the replenishing passage comprises conduit means carried by the housing and the movable valve element and effective to connect the first pressure-responsive means with the flow path between the inlet port and the first motor port established in the second position of the movable valve element.

4. The improvement defined in claim 3 in which the replenishing valve and a portion of that part of the replenishing passage extending between the replenishing valve and the first motor port are located in the movable valve element; and in which means carried by the housing and the movable valve element isolate the first motor port from said portion of the replenishing passage when the movable valve member is in its first position.

5. A valve comprising a housing containing a first valve member having a valving surface intersected by seven spaced chambers, namely, a central exhaust chamber, right and left outer exhaust chambers located on opposite sides of the central exhaust chamber, right and left motor chambers located between the central exhaust chamber and the two outer exhaust chambers, and right and left inlet chambers located between the central exhaust chamber and the two motor chambers; a second valve member carrying a valving surface which cooperates with the first valving surface and has three valve lands separated by two valve grooves, there being a central, a right, and a left land; right and left internal passages formed in the second valve member; right inner and right outer interconnecting passages extending through the second valving surface and intersecting the right internal passage; left inner and left outer interconnecting passages extending through the second valving surface and intersecting the left internal passage; a spring-biased check valve located in the left internal passage and arranged to prevent flow from the left outer to the left inner interconnecting passage through the left internal passage; a replenishing passage intersecting the left internal passage and opening through the surface of the second valving surface; a replenishing valve shiftable in passage-opening and passage-closing directions for controlling flow through the replenishing passage; a closed biasing chamber formed in the said second valve member; a biasing passage opening through the surface of the central land and intersecting the biasing chamber; means responsive to the pressure in the biasing chamber for urging the replenishing valve in the passage-closing direction; resilient means urging the replenishing valve in the passage-closing direction; means responsive to the pressure in the left internal passage for urging the replenishing valve in the passage-opening direction; and means for moving one valve member relatively to the other, the parts being so dimensioned that the valve has: a first operative position in which the left and right lands isolate the two motor chambers from the other chambers; a second position in which the central and left lands isolate the central exhaust chamber, the right inner interconnecting passage communicates with the right motor chamber, the right outer interconnecting passage communicates with the right outer exhaust chamber, the left inner interconnecting passage communicates with the left inlet chamber, the left outer interconnecting passage communicates with the left motor chamber, and the biasing passage communicates with the right inlet chamber; and a third position in which the central and right lands isolate the central exhaust chamber, the right inner interconnecting passage communicates with the right inlet chamber, the right outer interconnecting passage communicates with the right motor chamber, the left inner interconnecting passage communicates with the left motor chamber, the left outer interconnecting passage communicates with the left outer exhaust chamber, the replenishing passage communicates with the left inlet chamber, and the biasing passage communicates with the left inlet chamber.

6. The valve defined in claim 5 which includes right and left cross-over chambers intersecting the valving surface of the first valve member between the two motor chambers and the two inlet chambers; a passageway interconnecting the two cross-over chambers; and a third valve groove dividing the right land into inner and outer lands, the valve having a fourth position in which the groove between the central and left land interconnects the left cross-over chamber with the left motor chamber, the third groove interconnects the right cross-over chamber with the right motor chamber, the groove between the central and right inner lands interconnects the left inlet chamber and the central exhaust chamber, the right inner interconnecting passage communicates with the central exhaust chamber, and the right outer interconnecting passage communicates with the right cross-over chamber.

7. The valve defined in claim 6 in which in the first position the two valve grooves separating the central land from the left land and the right inner land connect the two inlet chambers with the central exhaust chamber.

References Cited in the file of this patent
UNITED STATES PATENTS

| | | |
|---|---|---|
| 2,267,284 | Livers | Dec. 23, 1941 |
| 2,367,682 | Kehle | Jan. 23, 1945 |
| 2,477,669 | Stephens | Aug. 2, 1949 |
| 2,610,022 | Meddock | Sept. 9, 1952 |
| 2,887,990 | Rogers | May 26, 1959 |